Figure 1:
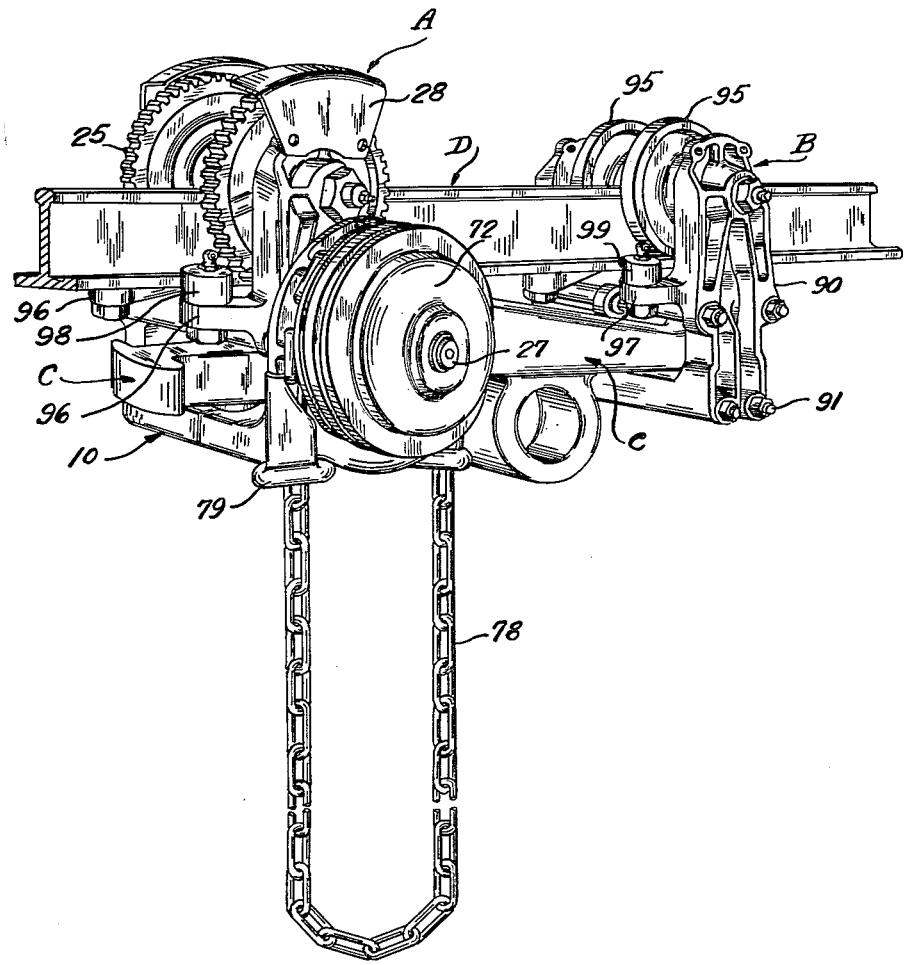

RE 25501

May 23, 1961     H. A. COTESWORTH     2,985,113
OVERHEAD MATERIAL HANDLING TROLLEYS

Filed May 28, 1958     2 Sheets-Sheet 1

INVENTOR.
HARRY A. COTESWORTH
BY Hudson, Boughton,
Williams, David & Hoffmann
ATTORNEYS May 23, 1961 H. A. COTESWORTH 2,985,113
OVERHEAD MATERIAL HANDLING TROLLEYS
Filed May 28, 1958 2 Sheets-Sheet 2

INVENTOR.
HARRY A. COTESWORTH
BY Hudson Boughton,
Williams, David & Hoffmann
ATTORNEYS United States Patent Office
2,985,113
Patented May 23, 1961

2,985,113
OVERHEAD MATERIAL HANDLING TROLLEYS
Harry A. Cotesworth, Cleveland, Ohio, assignor to The Cleveland Crane & Engineering Company, Wickliffe, Ohio, a corporation of Ohio
Filed May 28, 1958, Ser. No. 738,428
1 Claim. (Cl. 105—114)

This invention relates to overhead material handling apparatus and more especially to trolleys, both hand and power propelled, movable along overhead tracks or rails.

One of the principal objects of the invention is the provision of a new and novel trolley comprising an auxiliary drive for enabling an operator to accurately spot or position the trolley at a given point.

A further object of the invention is to provide a new and improved overhead trolley having an auxiliary drive, actuation of which auxiliary drive in one direction operates to engage the auxiliary drive and actuation thereof in another direction operates to disengage the auxiliary drive.

A further object of the invention is to provide a new and novel trolley having a reversible auxiliary drive engageable by the actuation thereof in the direction desired to move the trolley.

A further object of the invention is to provide a new and novel trolley having an auxiliary drive disengageable by the backing-off or reversing thereof.

A further object of the invention is to provide a new and novel overhead trolley which can be in the nature of a carrier, tractor, or the like, comprising an auxiliary drive which can be engaged for easily spotting the trolley at a selected point along a rail and which can be disengaged so that the trolley is free to be hand or power propelled along the rail without the added drag and frictional load resulting from an engaged auxiliary drive.

A further object of the invention is to provide a new and novel overhead trolley having a reversible auxiliary drive for the inching and/or spotting thereof along an overhead rail comprising a manual pull chain drive and on automatic clutch for disengaging the chain drive by merely backing off the chain a predetermined distance whereby the trolley is free to be hand or power propelled without a disadvantageous accompanying drag or friction load occurring from an engaged auxiliary drive.

The invention resides in certain novel constructions and combinations and arrangements of parts, and further objects and advantages of the invention will appear from the following description of the preferred embodiment described with reference to the accompanying drawings, which form a part of this specification and in which like reference characters designate corresponding parts in the several views.

Figure 2:
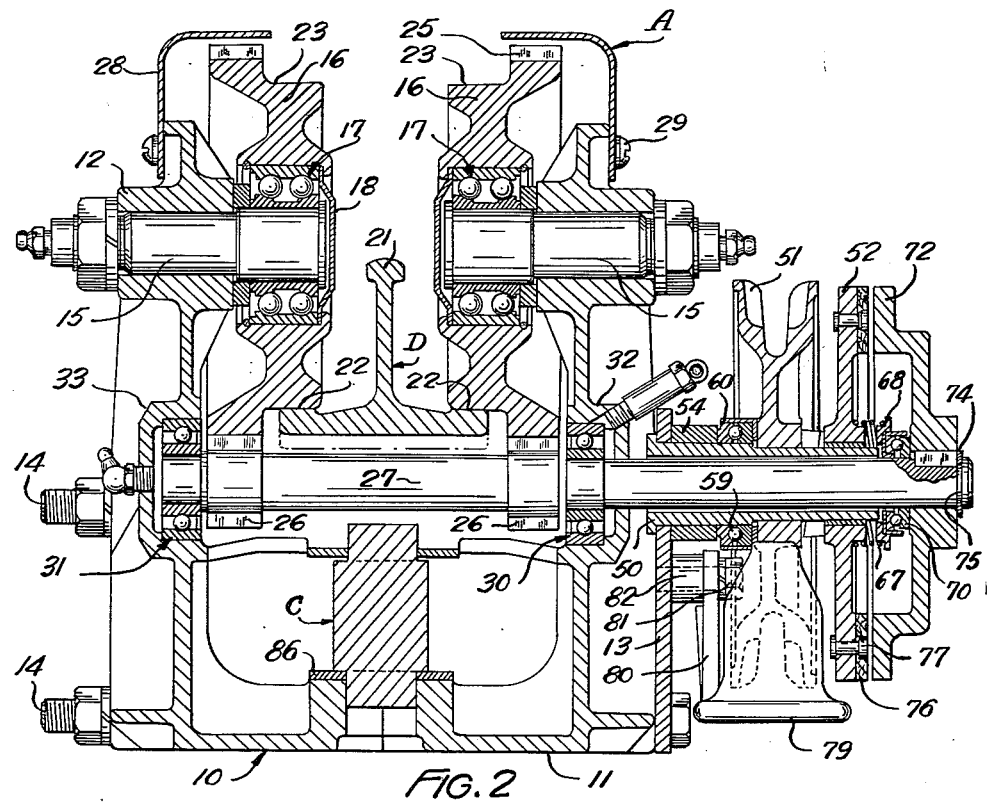
Figures 3, 4:
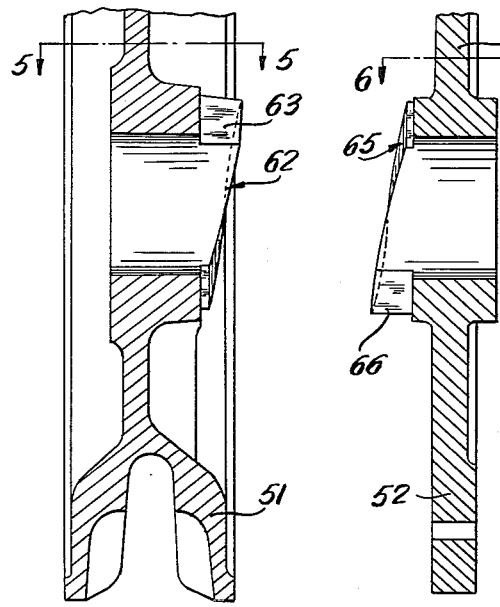
Figures 5, 6:
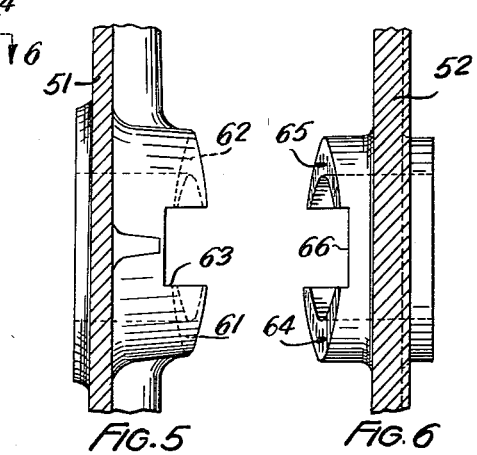

In the drawings:
Fig. 1 is a perspective view of a trolley, in the form of a carrier head embodying the present invention and which, as shown, is connected to an idler carrier head by a load bar;
Fig. 2 is a vertical section view with portions in elevation, of the trolley;
Fig. 3 is an enlarged fragmentary view of the chain wheel shown in Fig. 2;
Fig. 4 is an enlarged fragmentary view of the clutch plate shown in Fig. 2;
Fig. 5 is a fragmentary sectional view approximately on line 5—5 of Fig. 3; and
Fig. 6 is a fragmentary sectional view approximately on line 6—6 of Fig. 4.

Although the illustrative embodiment of the invention will be described in detail, it is to be understood that the invention is not limited to the construction and arrangement of the parts shown and described, but is capable of being otherwise embodied and of being practiced and carried out in various ways. It is also to be understood that the phraseology or terminology employed herein is for the purpose of description and not of limitation, and there is no intention to limit the claims beyond the requirements of the prior art.

Referring to the drawings, the reference character A indicates generally a trolley in the form of a carrier head including an auxiliary drive. The carrier A, as shown, is connected to an idler carrier head B by means of a load bar C having an eye member for supporting a load, not shown. The carrier head A and idler carrier head B are adapted to travel along a track, in the present instance a monorail D. The trolley or carrier head A, has a housing 10 comprising two vertically disposed trailer side frames 11, 12 and a vertically disposed plate 13, all secured together by means of four transverse bolts 14. The vertically disposed plate 13 is at the right hand side of the side frame 11, as best seen in Figure 2. The upper portions of the side frames have coaxially disposed holes, one on either side of the frame and each supporting a stubshaft 15 fixedly secured therein and projecting inwardly towards the center longitudinal plane of the carrier, that is, towards the rail D. A rail-engaging wheel 16 is journaled on each stubshaft 15 by means of a conventional ball bearing assembly 17 mounted on the enlarged inner end thereof. The bearing assembly 17 includes the usual inner and outer races with ball bearings interposed therebetween. A disk-like cup-shaped seal 18 is disposed over the inner end of each bearing assembly 17 so that lubricant is retained between an internal seal in the bearing assembly 17 and the seal 18. The rail D comprises symmetrical bearing surfaces 22 on either side of a central flange for engagement by the rail wheels 16. The wheels 16 include treads 23 for bearing upon the corresponding surfaces 22 on either side of rail D.

The wheels 16 are each provided with a gear 25 made integral therewith, which gears mesh with pinion gears 26 in axially spaced apart relationship on a driven shaft 27. It is to be understood that the gears 25 need not be made integral with the wheels 16, but may be separate gears secured thereto, if desired. The pinion gears 26 are also shown formed integral with the driven shaft 27 but they, too, may be separate gears secured to driven shaft 27. The upper parts of the gears 24 are each covered with sector-shaped protecting hoods or guards 28 of angular cross section secured to the housing 10 by means of screws 29.

The driven shaft 27 is mounted on the carrier housing directly beneath and parallel to the coaxial stubshafts 15 by means of conventional ball bearing assemblies 30, 31 disposed in cup-shaped embossments 32 and 33 in the side frames 11, 12, respectively, of the carrier housing. The two bearing assemblies are each provided with means of receiving lubricant, however, it is understood that other conventional means may be provided for lubricating the bearings.

The right-hand end of the shaft 27 projects through an elongated bushing 50 fixed on the plate 13 and which bushing carries the pull chain wheel 51 and the clutch plate 52 of the auxiliary drive, rotatably mounted thereon. The bushing projects through an aperture in the plate 13 and has a flange on its left-hand end which abuts against the side of the plate. A boss 54 is welded to the right-hand side of the plate 13 and a ball thrust bearing assembly 59 is interposed, on the bushing 50, between the boss 54 and the pull chain wheel 51. A sheet metal annulus 60 partially encloses the bearing 59.

The chain wheel 51 is rotatively or freely journaled upon the external periphery of bushing 50 and is positioned in axial abutment with an outer radial end portion of annulus 60. The chain wheel 51 has two arcuately shaped face cams 61, 62 formed integral therewith on the right-hand end of the hub thereof and separated from one another by a diametrical slot 63, see Figs. 3 and 5. Mating or complementary cams 64, 65 are formed integral on the adjoining end of the hub of the clutch facing plate 52, see Figs. 4 and 6. Cams 64, 65 are separated by a slot 66 similar to the slot 63. The cams 61, 62 and 64, 65 of each pair comprise substantially symmetrical, oppositely inclined, ramps or lifts of generally helical and curved contour relative to the axis of rotation thereof. From the foregoing, it will be apparent that upon relative rotation of the chain wheel 51 and clutch plate 52 they will be cammed apart in an axial direction by the cams 61, 64 or 62, 65, depending upon the direction of rotation.

The clutch plate 52 is rotatably mounted upon bushing 50 immediately to the right of the chain wheel 51 and is free to slide axially thereupon. A helical spring 67 disposed between the outer or right-hand face of the clutch plate 52 and a spring retainer 68 which is rotatably and slidably mounted adjacent to the end of bushing 50 is employed to bias the clutch plate in a direction to urge the cams on the clutch plate into frictional engagement with the cams on the chain wheel. The spring retainer 68 abuts the left-hand race of a thrust bearing 70 interposed therebetween and a driven clutch plate 72.

The driven clutch end plate 72 which is complementary to the driving clutch plate 52 is nonrotatably keyed to the extreme right end of drive shaft 27 and retained thereon by flat annular retainer snap ring 74 seated in annular groove 75 on the outer end of shaft 27. The clutch plate 52 is provided with an annular friction facing 76 of suitable material and secured thereto by appropriate means, such as rivets 77, on the face opposite the driven clutch plate 72. The construction is such that as the driving clutch plate 52 is cammed away from the chain wheel 51, the friction clutch comprising the driving and driven clutch elements 52, 72, respectively, are engaged to drive the shaft 27, and in turn, the wheels 16 in the direction opposite to that in which the chain wheel is rotated because of the drive being through the pairs of gears 25, 26.

A manually operable chain wheel actuating member, in the form of a pull-chain 78 is disposed over the chain wheel 51. The chain wheel 51 has depressions in its circumference which are adapted to receive the links of the chain to prevent slippage therebetween. The construction shown is similar to that used on commercial hoists. A chain guide 79 for maintaining the chain 78 in operative relationship with chain wheel 51, and comprising symmetrically disposed lugs 80 is bolted to the plate 13 of the housing by stud bolts 81. Collars 82 are placed upon the shanks of the bolts 81 and interposed between lugs 80 and plate 13 to suitably space the lugs 80 from the plate 13 and align the chain guide with the chain wheel.

The bottom portion of housing 10 is provided with a longitudinally extending opening within which the forward end of the load bar C projects and is pivotally supported for movement about a vertical axis. A bearing or rear washer 86 is positioned between the housing and the end of the load bar C. The other end of the load bar C is supported in a similar manner in the idler carrier head B.

Briefly, the idler carrier head B comprises a two-part housing 90 secured together by four bolts 91 and within which housing wheels 95 are secured in a manner similar to that in which the wheels 16 of the driven carrier are secured in the housing 10. As seen in Figure 1, the idler wheels 95 bear upon tracks 22 of the inverted T-shaped rail D, as do the wheels 16. Each side of both of the housings 10, 90 is provided with pairs of lugs 96, 97, respectively, lengthwise of the track and in opposite directions which support guide rollers 98, 99 for guiding the carrier heads along the track.

In order for the operator to engage the clutch plate 52 with the driven clutch plate 72, it is merely necessary to rotate the chain wheel in either direction by means of pull chain 78. This causes the cams to cam the clutch plates together. The strength of the spring 67 and the inclination or rise of the cams is such that the friction and the inertia of the clutch plate 52 are sufficient to keep the clutch plate 52 from rotating appreciably during the initial rotation of the chain wheel 51 and before the clutch is engaged. After the friction face 76 of clutch plate 52 frictionally engages the clutch plate 72, further movement of the pull chain 78 in the same direction will cause the clutch plates 52, 72 to rotate as a unit and drive the shaft 27 and in turn, the two wheels 16 to propel the carrier along the track. The clutch plates 52, 72 can be disengaged by merely backing off the chain wheel 51 a small increment. This allows the complementary cams to again rest, and the clutch plates 52, 72 disengage or move apart under the resilient action of helical biasing spring 67. With the clutch plates 52, 72 disengaged the trolley is free to be moved along the track independently of the pull chain drive. It is understood, of course, that the trolley can be driven or pulled along the rail by either manual or power means.

Due to the mechanical advantage derived by the use of the auxiliary drive and associated gearing of the carrier head, it is necessary to pull the chain 78 a considerable distance relative to the linear distance which the driving wheels 16 will travel. This is extremely advantageous for inching the trolley along the track to obtain a relatively accurate adjustment thereof or spotting of the load, etc. As pointed out hereinabove, however, the operator need only disengage the clutch in the manner described to permit rapid travel of the trolley along the rail or track.

While in the preferred embodiment of the invention shown the rail wheels 16 are employed to both support and drive the trolley, it is to be understood that the drive may be through a separate wheel engaging either the tread of the rail or some other part of the rail, such as the bottom side. It is also to be understood that while a pull chain type of wheel is illustrated, any form of manual or power wheel, such as a hand, sprocket, gear, etc., may be substituted therefor. It is further to be understood that while a particular form of reversible one-way engaging or overrunning clutch is employed to automatically connect and disconnect the drive means or wheel with and from the rail wheel, any suitable clutch of the type mentioned may be substituted therefor. It is the intention to hereby cover not only the above mentioned modifications of the preferred construction shown, but all adaptations, modifications, and uses thereof which come within the practice of those skilled in the art to which the invention relates, and the scope of the appended claim.

Having described my invention, I claim:

In a trolley for an overhead track having a frame with first and second rail wheels rotatably connected thereto and a gear wheel with means operatively connecting said gear wheel to one of said rail wheels, and a shaft rotatably supported by said frame, the improvement comprising a pinion gear fixedly secured on said shaft and permanently meshed with said gear wheel, a reversible drive means rotatably connected to said frame, and means including a reversible one-way engaging or overrunning friction type clutch means for connecting said reversible drive means to and from said shaft.

References Cited in the file of this patent

UNITED STATES PATENTS

| | | |
|---|---|---|
| 963,387 | Pauli | July 5, 1910 |
| 1,014,990 | Ahlborn | Jan. 16, 1912 |
| 1,350,648 | Fitch | Aug. 24, 1920 |
| 1,756,964 | Wilson | May 6, 1930 |
| 2,474,876 | White | July 5, 1949 |